United States Patent
Yapici et al.

(10) Patent No.: US 12,309,594 B2
(45) Date of Patent: May 20, 2025

(54) INTENTIONALLY FAKE CONFIGURATION TRANSMISSION

(71) Applicant: QUALCOMM Incorporated, San Diego, CA (US)

(72) Inventors: Yavuz Yapici, Florham Park, NJ (US); Igor Gutman, Hod HaSharon (IL); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/820,233

(22) Filed: Aug. 16, 2022

(65) Prior Publication Data

US 2024/0064517 A1    Feb. 22, 2024

(51) Int. Cl.
*H04W 12/122* (2021.01)
*H04W 12/06* (2021.01)

(52) U.S. Cl.
CPC ......... *H04W 12/122* (2021.01); *H04W 12/06* (2013.01)

(58) Field of Classification Search
CPC .. H04W 12/122; H04W 12/06; H04L 63/1491
See application file for complete search history.

(56) References Cited

U.S. PATENT DOCUMENTS

| | | | |
|---|---|---|---|
| 9,015,090 B2 * | 4/2015 | Chien | H04L 63/101 706/22 |
| 12,094,018 B1 * | 9/2024 | O'Malley | G06Q 50/184 |
| 2006/0123133 A1 * | 6/2006 | Hrastar | H04L 63/1491 709/240 |
| 2016/0150413 A1 * | 5/2016 | Meredith | H04W 12/06 455/410 |
| 2016/0165449 A1 * | 6/2016 | Poisner | H04W 12/12 726/4 |

(Continued)

FOREIGN PATENT DOCUMENTS

WO    2022118219 A1    6/2022

OTHER PUBLICATIONS

International Search Report and Written Opinion—PCT/US2023/029028—ISA/EPO—Oct. 20, 2023.

(Continued)

*Primary Examiner* — Julio R Perez
(74) *Attorney, Agent, or Firm* — Procopio, Cory, Hargreaves & Savitch

(57) ABSTRACT

A network node may identify at least one adversarial device. The network node may transmit a fake configuration to the at least one adversarial device. The fake configuration may be associated with a PHY technique. The fake configuration may be transmitted to the at least one adversarial device based on a location of the at least one adversarial device. The at least one adversarial device may be identified based on non-possession by the at least one adversarial device of any valid credential. The network node may transmit a correct configuration to a genuine receiving device. The network node may transmit the fake configuration and the correct configuration in parallel or based on time division multiplexing. Accordingly, security of the overall system may be improved as the adversarial device may waste time and power performing algorithmic operations based on the fake configuration.

30 Claims, 11 Drawing Sheets

(56) References Cited

U.S. PATENT DOCUMENTS

2018/0184286 A1* 6/2018 Patterson .............. H04W 12/02
2024/0015684 A1* 1/2024 Wiacek ............... H04W 12/122
2024/0064517 A1* 2/2024 Yapici ................ H04L 63/1491

OTHER PUBLICATIONS

Ranaweera P., et al., "Survey on Multi-Access Edge Computing Security and Privacy", IEEE Communications Surveys Tutorials, USA, vol. 23, No. 2, Feb. 26, 2021, pp. 1078-1124, XP011856050, Abstract p. 1078, Para. 1—p. 1083, Para 2.C, p. 1085, para. II.D—p. 1093, para IV.B.2, fig. 1-4.

* cited by examiner

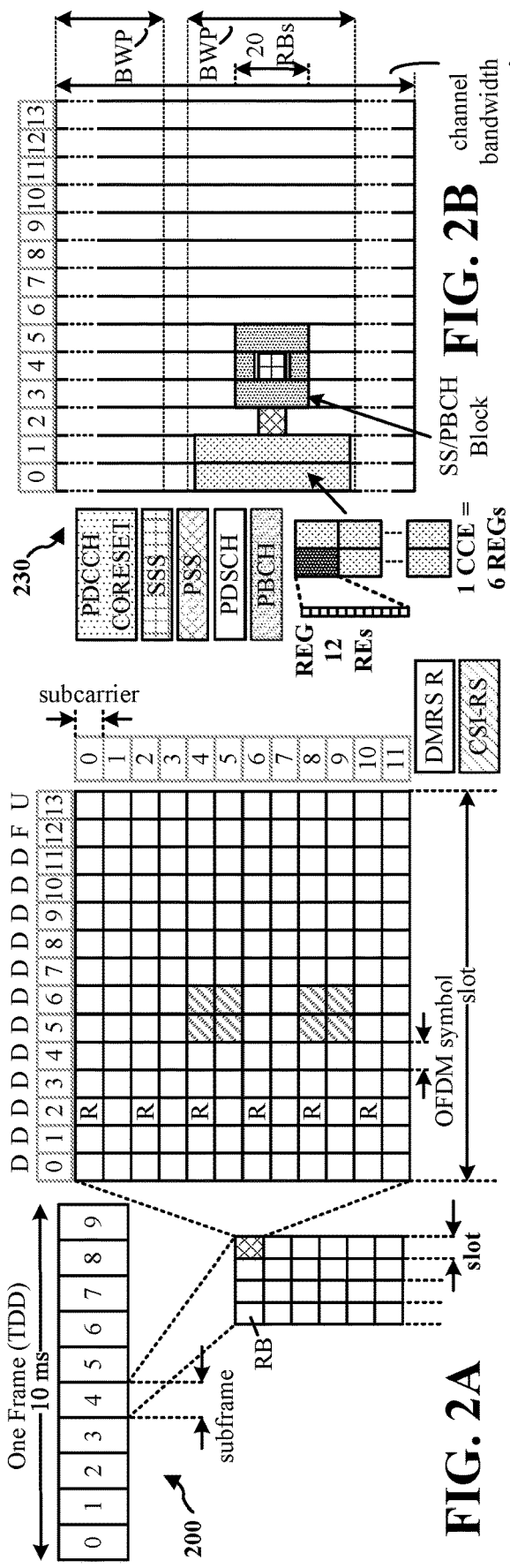
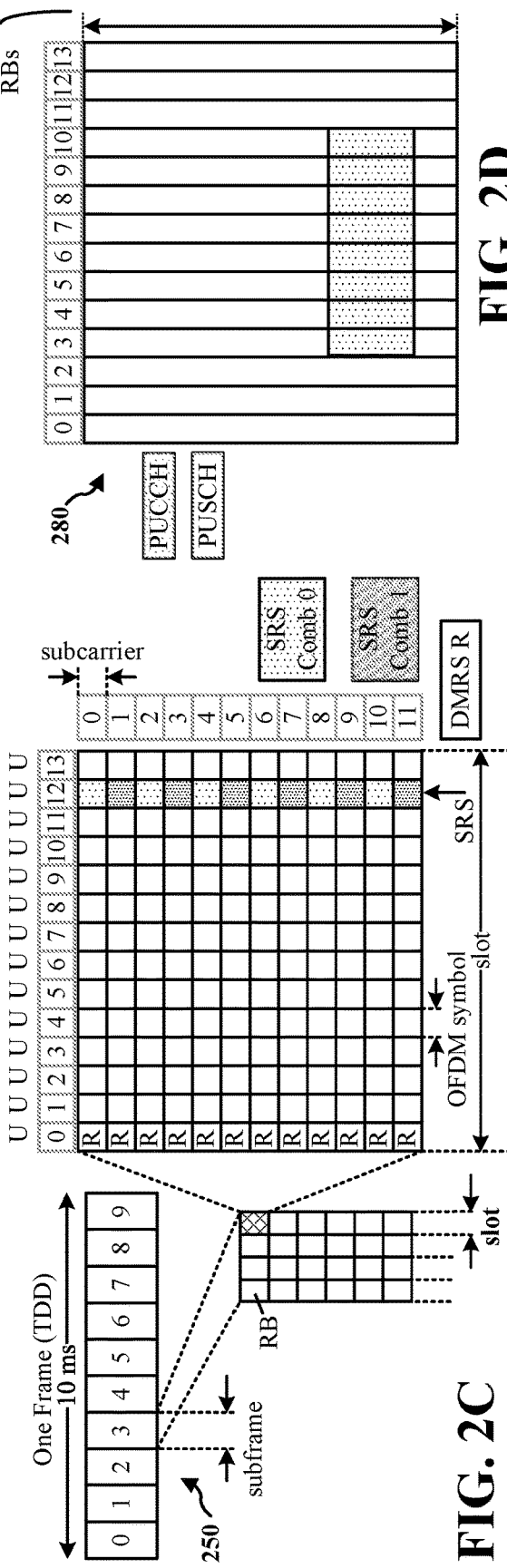
FIG. 2A
FIG. 2B
FIG. 2C
FIG. 2D

US 12,309,594 B2

INTENTIONALLY FAKE CONFIGURATION TRANSMISSION

TECHNICAL FIELD

The present disclosure relates generally to communication systems, and more particularly, to actively impairing an adversarial device by transmitting a fake configuration to the adversarial device in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a network node. The apparatus may identify at least one adversarial device. The apparatus may transmit a fake configuration to the at least one adversarial device. The fake configuration may be associated with a physical layer (PHY) technique.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
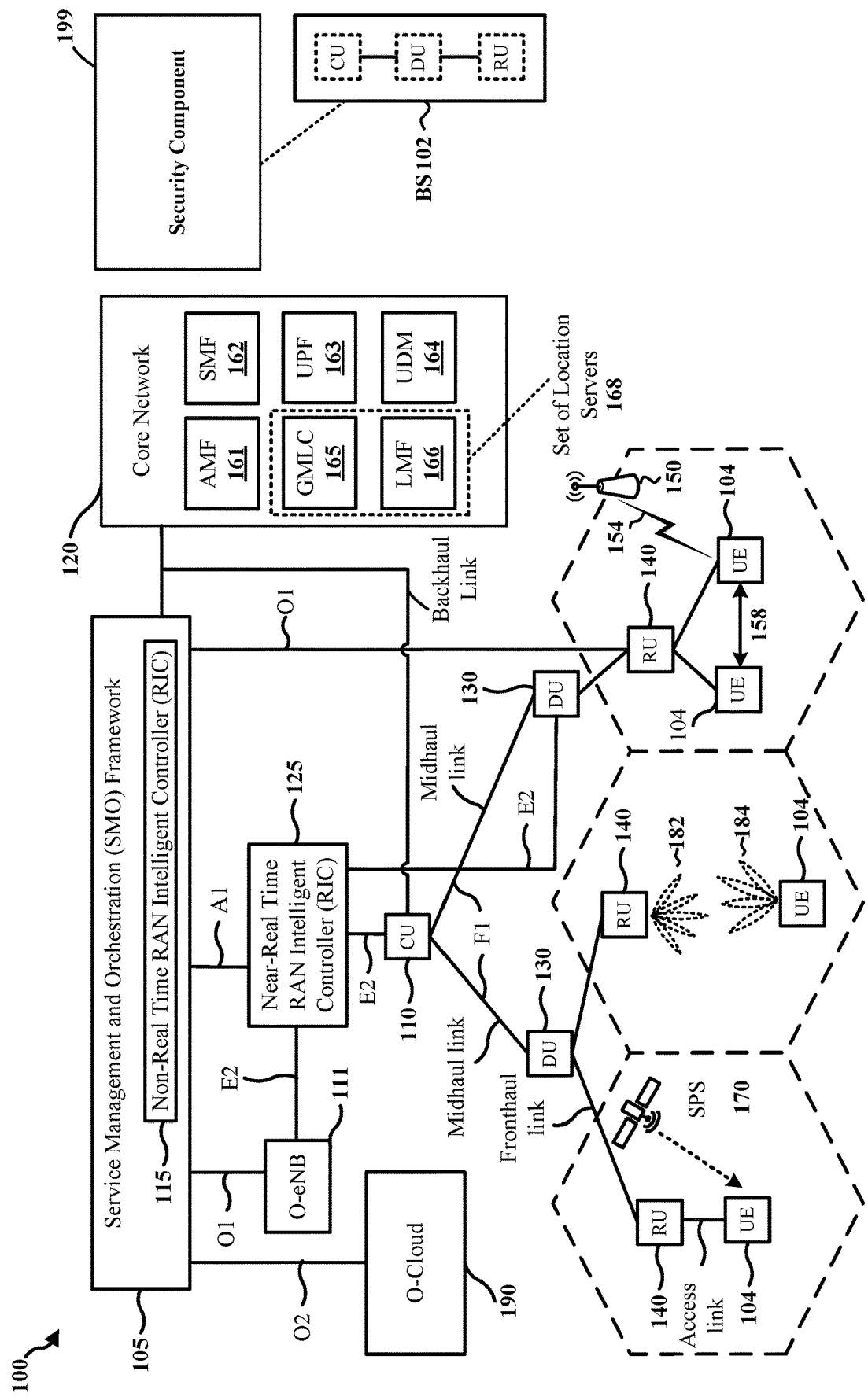
FIG. 1 is a diagram illustrating an example of a wireless communications system and an access network, in accordance with various aspects of the present disclosure.

Upper-layer cryptography may provide confidentiality and data integrity. Further, reference signals may be important in many 5G NR functionalities (e.g., channel estimation, positioning, etc.). The absence of security protection for reference signals may make any transmission over the reference signals vulnerable to malicious attacks, and as a result, may impair the reliability of subsequent communications functions.

In some configurations, a legitimate transmitter may securely and reliably share (e.g., transmit) a configuration to legitimate (genuine) receivers over reference signals in the presence of non-legitimate (malicious) receivers. The configuration sharing process may be passive in the sense that the legitimate transmitter may not actively aim at impairing any adversary (e.g., an adversarial device) at all although the adversarial device may have exposed its malicious nature to the transmitter or the network (e.g., a RAN or a core network).

According to one or more aspects of the present disclosure, a legitimate transmitter (e.g., a network node such as a base station) may actively seek to impair adversarial devices (and interrupt the reliability of the subsequent algorithmic tasks at the adversarial devices) by transmitting a fake configuration to the adversarial devices. In particular, the legitimate transmitter may transmit the fake configuration either directionally or in a broadcast fashion while continuing to securely share the correct configuration with genuine receivers in parallel. Accordingly, in this way, the adversarial devices may be forced to waste power and/or time running algorithms based on the fake configuration.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 may include a security component 199 that may be configured to identify at least one adversarial device. The security component 199 may be configured to transmit a fake configuration to the at least one adversarial device. The fake configuration may be associated with a PHY technique. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
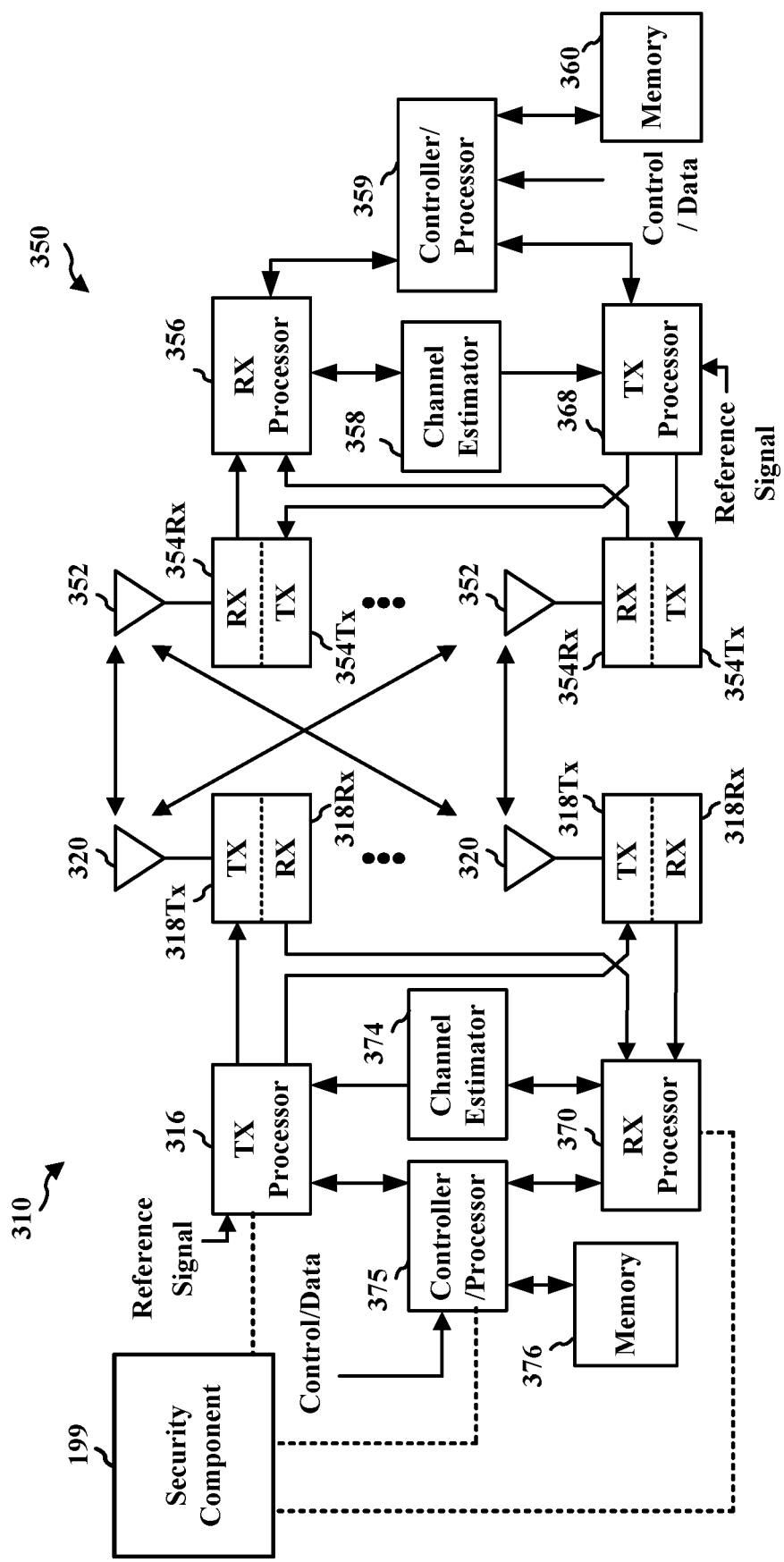
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer (PHY), may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the security component 199 of FIG. 1.

Figure 4:
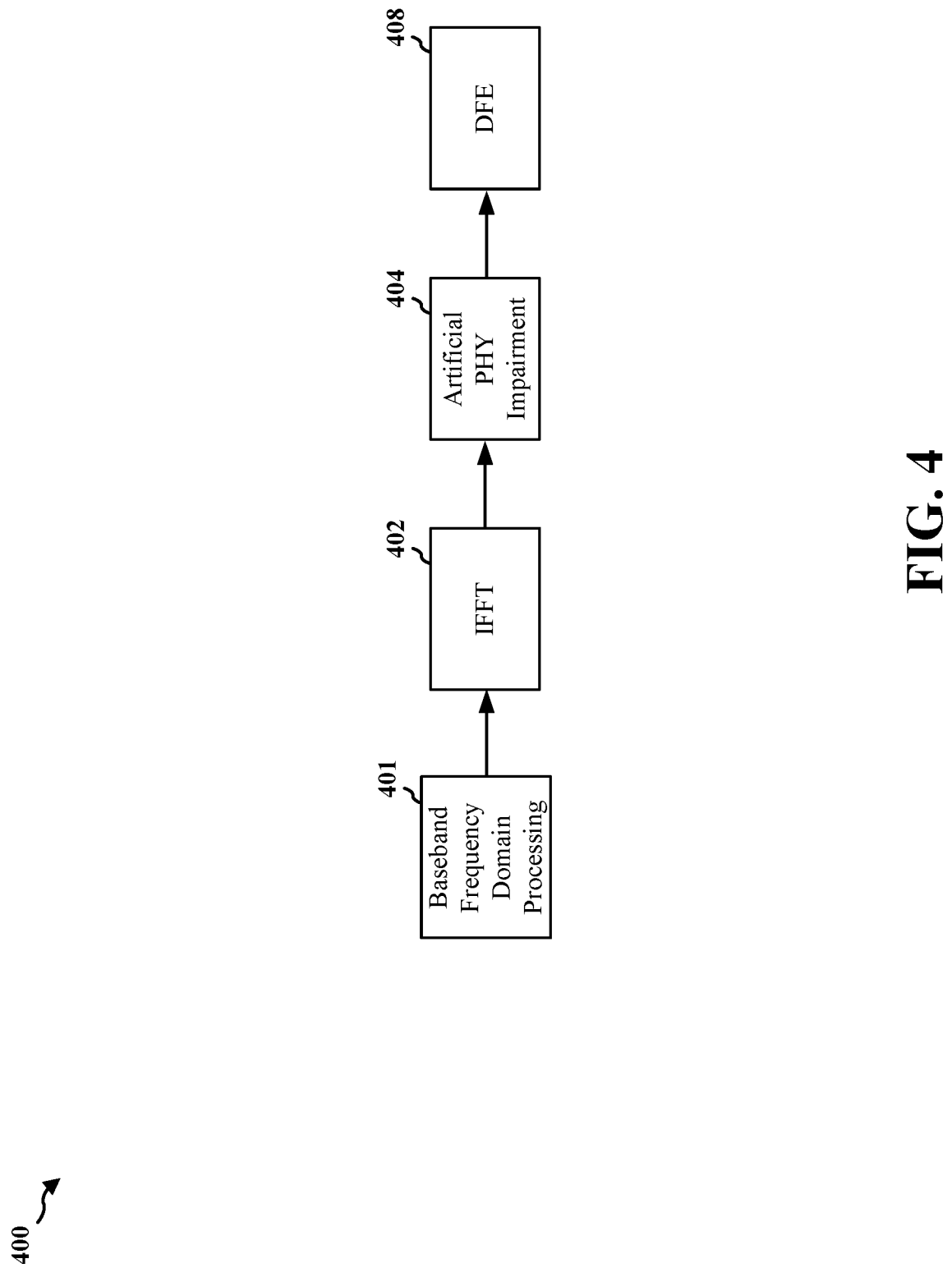
FIG. 4 is an example block diagram illustrating addition of an artificial physical layer (PHY) impairment, in accordance with various aspects of the present disclosure.

FIG. 4 is an example block diagram 400 illustrating addition of an artificial PHY impairment. The artificial PHY impairment (e.g., an amplitude-modulation-to-phase-modulation (AMPM) impairment or a frequency domain residual sideband (FDRSB) impairment) may be a PHY technique as described hereinafter. For example, the artificial PHY impairment may be used as a signature that both authenticates the transmitter and encrypts the transmission. A receiver may receive an indication of the PHY impairment from the transmitter. Based on the indication, the receiver may confirm that a transmission with a PHY impairment consistent with the indication was transmitted by the transmitter. Further, the receiver may recover the content of the transmission by removing the PHY impairment based on the indication. Adding the artificial PHY impairment in the oversampled domain (e.g., the output of the digital front-end (DFE) block 408, also known as the digital to analog converter (DAC) input) may introduce out-of-band leakage, which may lead to a violation of the adjacent channel leakage ratio (ACLR) specification. Accordingly, the artificial PHY impairment may be added in the baseband domain at block 404 between the IFFT block 402 (The output of the baseband frequency domain processing 401 becomes the input to the IFFT block 402) and the DFE block 408.

Because the artificial PHY impairment is introduced in the baseband domain, all the impairment may be folded to the in-band, which may be associated with a cost in terms of the error vector magnitude (EVM). Further, the added artificial PHY impairment may be removed at the receiver. However, due to other impairments (e.g., thermal noise, channel noise, etc.) the removal of the artificial PHY impairment at the receiver may not be perfect. In one or more configurations, if the artificial PHY impairment is also added to the at least one data portion of the downlink traffic (e.g., PDSCH and/or PDCCH), a digital post-distortion (DPoD) technique (which may be applied iteratively) may be utilized to improve (e.g., reduce) the EVM associated with the at least one data portion of the downlink traffic.

In some configurations, the configuration that (fully or partially) describes parameters of a certain PHY technique (e.g., a technique in PHY aiming at security, reliability, etc.) may be shared by a transmitter with the receiver ahead of the time (i.e., before actually executing the PHY technique in future operations). Transmitting (sharing) a configuration using reference signals in PHY may be associated with the benefit of having a short response time due to the fast propagation characteristic in PHY. In some configurations, the transmission of a configuration from a legitimate transmitter may be secure directly in PHY such that no adversarial device (e.g., any unauthorized device with radio capability) attempting to steal information from a reference signal is able to learn the configuration. Further, the transmission of a configuration from a legitimate transmitter may be authentic in that no device other than the legitimate transmitter may transmit and share the configuration.

With existing passive approaches, the legitimate transmitter may not actively aim at impairing any adversarial device even if the adversarial device may have exposed its malicious nature to the transmitter or the network.

According to one or more aspects of the disclosure, a legitimate transmitter (e.g., a network node such as a base station) may actively seek to impair adversarial devices by transmitting a fake configuration (e.g., a configuration that includes, in whole or in part, parameters of the PHY technique that are purposefully designed to be incorrect) to the adversarial devices while continuing to securely share the correct configuration (e.g., a configuration that includes correct parameters of the PHY technique) with the legitimate receivers (e.g., legitimate UEs) in parallel. In some configurations, where the legitimate transmitter or the network has already detected the location of adversarial devices, the transmitter may transmit a fake configuration towards the adversarial devices in a directional fashion. For example, the directional transmission of the fake configuration may be suitable for scenarios where the transmitter may be equipped with multiple antennas and a sufficient number of RF chains.

In some other configurations, the legitimate transmitter may transmit the fake configuration in a broadcast fashion (i.e., the transmission may not be associated with any particular direction), where the fake/false configuration may be intended for adversarial devices that have not provided valid credentials (e.g., adversarial devices that may not possess any valid credentials). For example, the broadcast transmission of the fake configuration may not use the location information of the adversarial devices, and may be suitable for scenarios where the transmitter may be equipped with a single antenna (e.g., the transmitter may be a low cost device).

Figure 5:
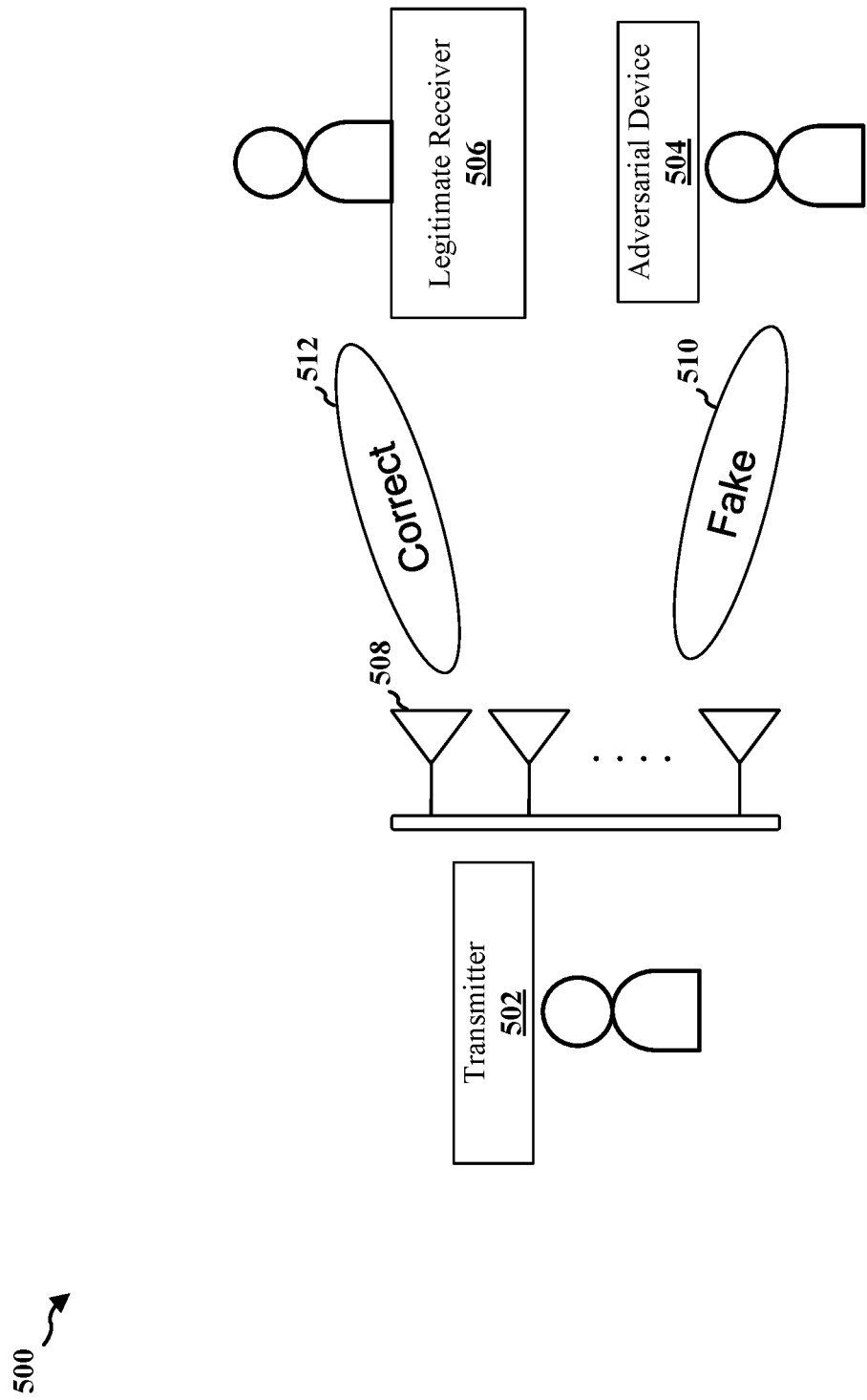
FIG. 5 is a diagram illustrating an example process of directional transmission of a fake configuration to an adversarial device, in accordance with various aspects of the present disclosure.

FIG. 5 is a diagram illustrating an example process 500 of directional transmission of a fake configuration to an adversarial device. As shown, the (legitimate) transmitter 502 may be a transmitter equipped with multiple RF chains and multiple antennas 508. Accordingly, the transmitter 502 may be capable of transmitting signals in a directional fashion (e.g., via beamforming). In some configurations, the transmitter 502 may transmit a fake configuration 510 directly towards the adversarial device 504 in a directional fashion order to impair the subsequent algorithmic operations at the adversarial device 504. For example, based on the fake configuration 510, the adversarial device 504 may attempt to perform algorithmic operations to implement a PHY technique. However, due to the fake nature of the fake configuration 510, the time and power expended by the adversarial device 504 in performing the algorithmic operations may amount to a complete waste.

In particular, the network (e.g., a RAN or a core network) associated with the transmitter 502 may aggregate information about the adversarial device 504. The information about the adversarial device 504 may be reported to the network by various legitimate devices such as transmitters and/or receivers (e.g., the legitimate devices may have been attacked by the adversarial device 504). Further, the information about the adversarial device 504 reported by each of the legitimate devices may include, for example, one or more of a slot index, a time allocation, a frequency allocation, a reception beam index, a timing offset, a direction of arrival (DOA) of a signal, a reference signal received power (RSRP), or a received signal strength indicator (RSSI). Thus, the network, with potential assistance from one or more of the legitimate devices, may obtain the location of the adversarial device 504 (e.g., using triangulation, trilateration, etc.).

Then, the network may notify legitimate transmitters within the communication range of the adversarial device 504 about at least the location of the adversarial device 504. The transmitter 502 may be one of the legitimate transmitters within the communication range of the adversarial device 504.

Having received the indication of the location of the adversarial device 504, the transmitter 502, in some configurations, may prepare a new fake configuration (e.g., fake configuration 510) each time the transmitter 502 prepares a correct configuration (e.g., correct configuration 512) for a legitimate receiver (e.g., the legitimate receiver 506, which may be a legitimate UE). Thereafter, based on the location of the adversarial device 504, the transmitter 502 may transmit the fake configuration 510 directly towards the adversarial device 504 in a directional fashion (e.g., using beamforming).

In some configurations, if the transmitter 502 has a sufficient number of RF chains, the transmitter 502 may dedicate one or more of the RF chains to the transmission of the fake configuration 510 while using the remaining RF chains to transmit the correct configuration 512 towards legitimate receivers (e.g., the legitimate receiver 506) in parallel (e.g., simultaneously).

In some configurations, the transmitter 502 may dedicate all RF chains to the transmission towards a same receiver at a time (e.g., the transmitter 502 may have a single RF chain). Accordingly, the transmitter 502 may transmit the fake configuration 510 and the correct configuration 512 to their respective intended directions in a time division multiplexed fashion. For example, the transmitter 502 may transmit the fake configuration 510 and the correct configuration 512 to their respective intended directions using a time division pattern (e.g., a particular one of n slots for the correct configuration 512, the rest slots for the fake configuration 510). In some configurations, the transmitter 502 may share the time division pattern with the legitimate receivers over the layer 3 (L3) (e.g., securely with cryptography).

In some configurations, the transmitter 502 may transmit the fake configuration 510 and the correct configuration 512 to their respective intended directions in a frequency division multiplexed fashion.

Figure 6:
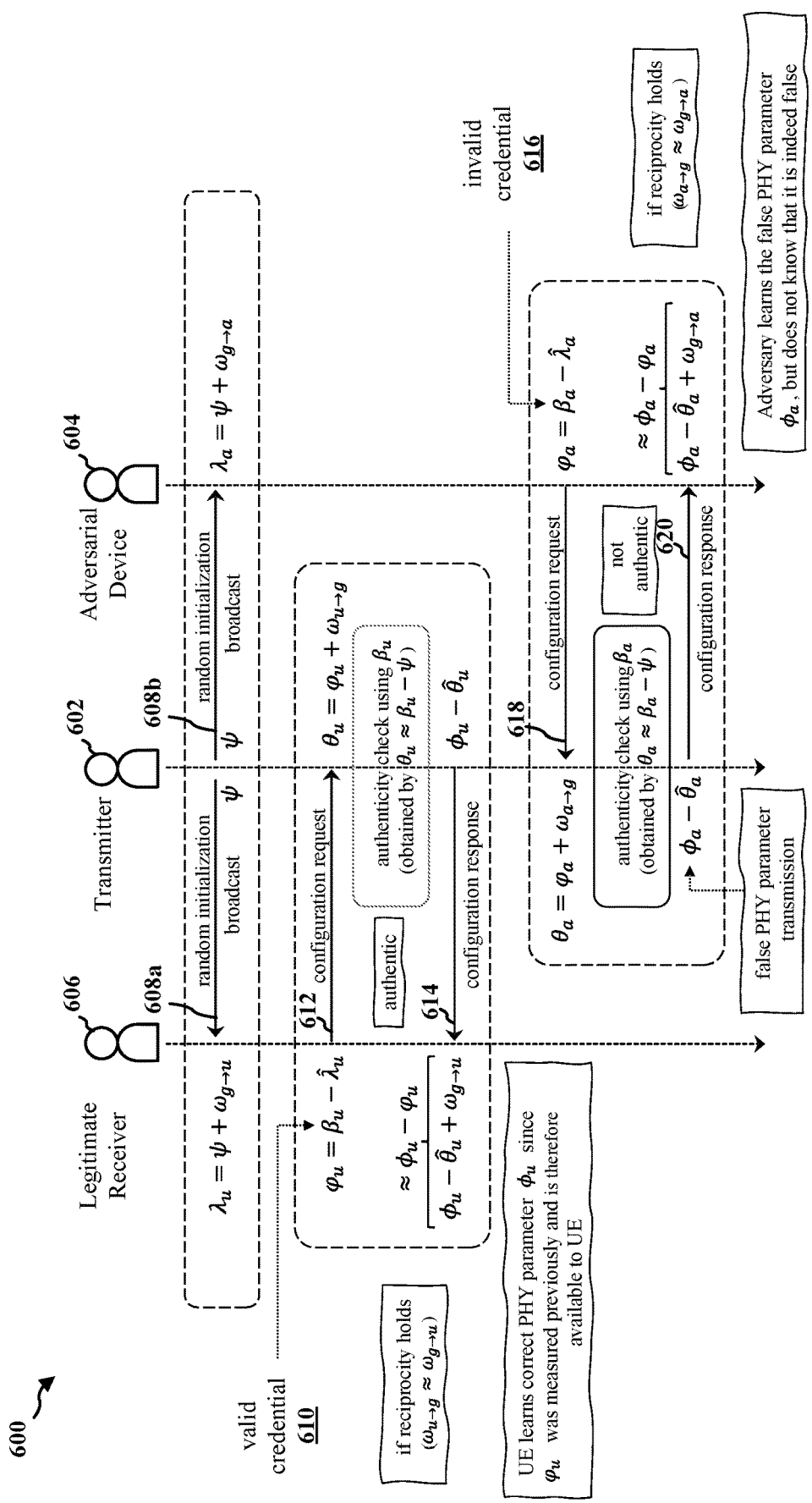
FIG. 6 is a diagram illustrating an example process of transmission of a fake configuration to an adversarial device in a broadcast fashion, in accordance with various aspects of the present disclosure.

FIG. 6 is a diagram illustrating an example process 600 of transmission of a fake configuration to an adversarial device in a broadcast fashion. As shown, a (legitimate) transmitter 602 (e.g., a network node such as a base station) may share a fake/false configuration with an adversarial device 604 (e.g., at least one adversarial device), where the adversarial device 604 may request a configuration (e.g., based on an on-demand configuration sharing process) without providing any valid credentials for authentication. At 608a and 608b, the transmitter 602 may broadcast a random signal to initialize the procedure. Any receiver (legitimate or non-legitimate), including the adversarial device 604 and the legitimate receiver 606, may respond to the broadcast random initialization signal and ask for a configuration. Some of the receivers may transmit their own credentials to the transmitter 602 for authentication.

In some configurations, the transmitter 602 may share the correct configuration with the authenticated receivers (e.g., the legitimate receiver 606, which may be a legitimate UE) that have provided valid credentials, and may transmit a fake configuration (instead of not transmitting anything) to any adversarial receiver (e.g., the adversarial device 604) that has failed to provide any valid credential (e.g., as adversarial devices that may not possess any valid credentials).

In the process illustrated in FIG. 6, the transmitter 602 may not know the location of either the adversarial device 604 or the legitimate receiver 606. Accordingly, transmission of a fake configuration to an adversarial device in a broadcast fashion may be the suitable for scenarios where the transmitter 602 may be equipped with a small number of antennas (e.g., a single antenna) and may be capable of omnidirectional configuration transmission but not directional transmission in multiple directions.

The process illustrated in FIG. 6 may include a random initialization phase, which may include, e.g., 608a and 608b, and a configuration request/response phase, which may include, e.g., 612, 614, 618, and 620. The process illustrated in FIG. 6 may be completed within the channel coherence time (i.e., the time duration over which the channel remains (roughly) the same) because as will be described in further detail below, the PHY-secure transmission may rely on channel reciprocity.

The transmitter 602 may perform the random initialization phase at 608a and 608b. In particular, the transmitter 602 may broadcast a random initialization signal which that may carry a random phase $\psi$. The random initialization signal may be received by the adversarial device 604 as well as the legitimate receiver 606. In one or more configurations, the random phase $\psi$ may be known to the transmitter 602 but not to other devices.

To prevent any adversarial device from recording the configuration request and/or response of a legitimate receiver and reusing the recorded information to deceive the transmitter 602 in the future, that is, to prevent a replay attack, the transmitter 602 may select or generate a new phase random value $\psi$ each time the transmitter 602 broadcasts a new initialization signal.

The purpose of the random initialization may be to provide any receiver with a phase reference. The random initialization signal may be subjected to the unique channel between the transmitter 602 and the particular receiver. Based on the received random initialization signal that may include a phase reference, a receiver of the random initialization signal may be able to securely share the credential of the receiver through a phase difference-based transmission while requesting the configuration from the transmitter 602.

The configuration request and response phase for an arbitrary receiver (e.g., an adversarial device 604 or a legitimate receiver 606) may be described as follows. In the following description, the superscript r may represent either the superscript u (for a legitimate receiver) or the superscript a (for an adversarial) in FIG. 6.

After the transmitter 602 broadcasts the random initialization signal at 608a and 608b, the phase response of the channel at the arbitrary receiver may become $\lambda_r = \psi + \omega_{g \to r}$, where $\omega_{g \to r}$ may be the phase rotation caused by the RF front-ends (at both the transmit and receive ends) and the signal propagation over the channel. The receiver may measure the received post-phase rotation random initialization signal as $\hat{\lambda}_r$.

Based on the measured $\hat{\lambda}_r$, the receiver may prepare a configuration request. The configuration request may carry the credentials of the receiver. Accordingly, the configuration request may include the phase value $\varphi_r = \beta_r - \hat{\lambda}_r$ with $\beta_r$ being the phase-modulated credentials of the receiver. For example, the legitimate receiver 606 may have a valid credential 610. Further, the adversarial device 604 may have an invalid credential 616 or have no credential at all. In other words, the adversarial device 604 may not be in possession of any valid credential. Then, at 612 for the legitimate receiver 606 and at 618 for the adversarial device 604, the receiver may send the configuration request to the transmitter 602.

Even if an arbitrary receiver (e.g., an eavesdropper) may measure $\varphi_r = \beta_r - \hat{\lambda}_r$, the eavesdropper may not learn the phase $\beta_r$ because the eavesdropper may not know $\hat{\lambda}_r$. In other words, the credentials may be conveyed via $\varphi_r$ in a PHY-secure fashion.

The phase of the configuration request 612/618 as received at the transmitter 602 may be $\theta_r = \varphi_r + \omega_{r \to g}$, which may be (roughly) equivalent to $\beta_r - \psi$ due to channel reciprocity (i.e., $\omega_{r \to g} \approx \omega_{g \to r}$) and the fact that $\varphi_r = \beta_r - \hat{\lambda}_r$. Therefore, the received phase of the configuration request 612/618 may be measured by the transmitter 602 as $\hat{\theta}_r \approx \beta_r - \psi$. As a result, the phase $\beta_r$ representing the credentials may become readily available to the transmitter 602 because the transmitter 602 already knows the initial random phase $\psi$).

The transmitter 602 may then perform an authentication test (e.g., a distribution-based hypothesis test, Hamming distance-based similarity test, etc.) to decide if the received credentials represented by $\beta_r$ are valid. Based on whether the credentials are valid, the transmitter 602 may prepare a configuration response.

If the credentials are valid (e.g., the valid credential 610 possessed by the legitimate receiver 606 and conveyed in the configuration request 612) and the authentication is successful, the transmitter 602 may prepare a correct configuration, which may be represented by a phase-modulated parameter $\phi_u$. On the other hand, if the credentials are invalid (e.g., the invalid credential 616 possessed by the adversarial device 604 and conveyed in the configuration request 618, or no credential at all, as the adversarial device 604 may not be in possession of any valid credential) and the authentication fails, the transmitter 602 may prepare a fake/false configuration, which may be represented by a phase-modulated parameter $\phi_a$.

In some configurations, a valid credential may be associated with a lifetime, which may correspond to a predefined amount of time. The lifetime of the credential may be set by the network based on the attack situation.

Based on the configuration (correct or fake/false), the transmitter 602 may construct the configuration response as $\phi_r - \hat{\theta}_r$, where $\hat{\theta}_r$ may be the measured channel phase from the previous operation and $\phi_r$ may be the configuration (either $\phi_u$ for the legitimate receiver 606 or $\phi_a$ for the adversarial device 604). Thereafter, at 614 for the legitimate receiver 606 and at 620 for the adversarial device 604, the transmitter 602 may transmit the configuration response $\phi_r - \hat{\theta}_r$ back to the receiver (e.g., the legitimate receiver 606 or the adversarial device 604).

Even if the phase $\phi_r - \hat{\theta}_r$ is measured by an arbitrary receiver (e.g., an eavesdropper), the eavesdropper may not learn the phase $\phi_r$ because the eavesdropper may not know $\hat{\theta}_r$. In other words, the confidential configuration may be conveyed via $\phi_r - \hat{\theta}_r$ in a PHY-secure fashion.

The respective phase of the configuration response 614/620 at the receiver (e.g., the legitimate receiver 606 or the adversarial device 604) may become $\phi_r - \hat{\theta}_r + \omega_{g \to r}$, which may be (roughly) equivalent to $\phi_r - \varphi_r$, due to channel reciprocity (i.e., $\omega_{r \to g} \approx \omega_{g \to r}$) and the fact that $\hat{\theta}_r = \varphi_r + \omega_{r \to g}$. Then, the estimate of the residual phase $\phi_r - \varphi_r$ may be exploited by the receiver (e.g., the legitimate receiver 606 or the adversarial device 604) to learn the configuration via $\phi_r$ because $\varphi_r$ may be already available to the receiver (the receiver previously constructed $\varphi_r = \beta_r - \hat{\lambda}_r$ for the configuration request).

The receiver (e.g., the legitimate receiver 606 or the adversarial device 604) may have no ability to check whether the received configuration $\phi_r$ is a correct configuration or a fake/false configuration. Hence, the adversarial device 604 (which has not provided any valid credentials) may be deceived by the fake/false configuration $\phi_a$.

In some configurations, the phase parameters $\beta_r$ and $\phi_r$ may be multiple bits in length. Accordingly, multiple tones may be used in the frequency domain to transmit the phase parameters $\beta_r$ and $\phi_r$ in the configuration request 612/618 and the configuration response 614/620, respectively. In some other configurations, a single tone may be used in the frequency domain to transmit either of the phase parameters $\beta_r$ and $\phi_r$.

In some configurations, the transmitter 602 may include (e.g., append) a cyclic redundancy check (CRC) in the phase parameter $\phi$ (e.g., using frequency domain resource blocks) to enable the receiver (e.g., the legitimate receiver 606) to verify the accuracy of the received phase $\phi$ and hence the configuration. If the receiver identifies a received phase $\phi$ as inaccurate based on the CRC, the receiver may transmit a negative acknowledgement (NACK) to the transmitter 602. Accordingly, in some configurations, if the transmitter 602 does not receive a NACK (e.g., within a time window after a transmission), the transmitter 602 may assume that the receiver has learned the configuration correctly.

If the transmitter 602 receives a NACK, in one configuration, the transmitter 602 might try resharing the configuration following the same procedure as described above. In another configuration, if the transmitter 602 receives a NACK, the transmitter 602 may suspend the configuration transmission process for a preconfigured time period. In some configurations, if the suspension time period is longer than a network-selected authentication lifetime or the channel coherence time, the authentication procedure may also be repeated prior to the resumption of configuration transmission.

Due to imperfections in channel reciprocity and phase estimation, $\beta_r - \psi$ and $\phi_r - \varphi$ may be inaccurate/erroneous. Accordingly, in some configurations, the transmit-receive pair (e.g., the transmitter 602-legitimate receiver 606 pair) may (e.g., periodically, where the periodicity may be, for example, on the order of the channel coherence time Tc (e.g., every Tc, every 2×Tc, etc.)) exchange known phase parameters $\beta$ and/or $\phi$ to measure and quantify the errors between the received and the expected values of $\varphi_r - \psi$ and $\phi_r - \varphi$ ($\psi$ and $\varphi$ are used because $\psi$ and $\varphi$ are available to respective related devices/parties).

In some configurations, the network may (dynamically or statically) set thresholds for the errors associated with $\beta_r - \psi$ and $\phi_r - \varphi$, as described above, based on whether the transmitted data is known or not known to the receiver. In some configurations, different thresholds may be set for the errors associated with $\beta_r - \psi$ and $\phi_r - \varphi$. In some configurations, if the error measurements for $\beta_r - \psi$ and $\phi_r - \varphi$ are both below their respective thresholds, the phase difference-based configuration sharing process as illustrated in FIG. 6 may be allowed. On the other hand, if at least one of the error measurements for $\beta_r - \psi$ and $\phi_r - \varphi$ is below its respective threshold, the phase difference-based configuration sharing process may be suspended until at least the phase errors (e.g., error terms associated with $\beta_r - \psi$ and/or $\phi_r - \varphi$) are measured the next time.

Figure 7:
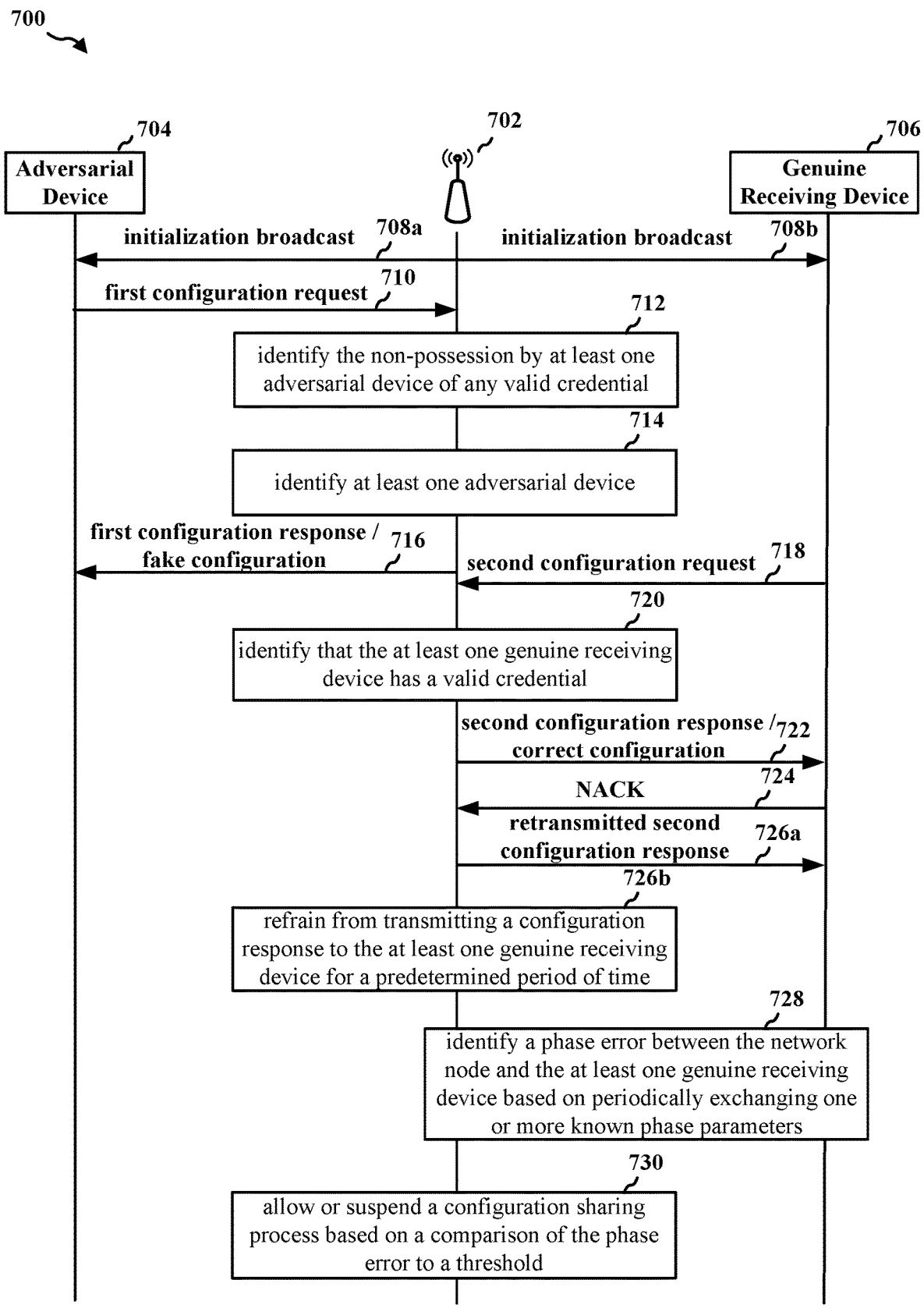
FIG. 7 is a diagram of a communication flow of a method of wireless communication, in accordance with various aspects of the present disclosure.

FIG. 7 is a diagram of a communication flow 700 of a method of wireless communication. Network node 702, at least one adversarial device 704, and at least one genuine receiving device 706 (e.g., an authorized receiver such as a UE authenticated by the network) may correspond to the transmitter 502/602, the adversarial device 504/604, and the legitimate receiver 506/606, respectively. At 708a and 708b, the network node 702 may transmit an initialization broadcast (e.g., the random initialization signal at 608a and 608b).

At 710, the network node 702 may receive a first configuration request from the at least one adversarial device 704.

At 712, the network node 702 may identify the non-possession by the at least one adversarial device 704 of any valid credential based on the first configuration request 710 and an authentication test. For example, the network node 702 may understand that the device 704 is an adversarial device because the device 704 cannot respond at 710 with a valid credential.

In one or more configurations, the first authentication test may include a distribution-based hypothesis test or a Hamming distance-based similarity test.

At 714, the network node 702 may identify at least one adversarial device 704.

At 716, the network node 702 may transmit a fake configuration to the at least one adversarial device 704. The fake configuration may be associated with a PHY technique. In some configurations, the network node 702 may transmit a first configuration response including the fake configuration to the at least one adversarial device 704.

In one or more configurations, the fake configuration may be transmitted, at 716, to the at least one adversarial device 704 based on a location of the at least one adversarial device 704.

In one or more configurations, the at least one adversarial device 704 may be identified, at 714, based on non-possession by the at least one adversarial device 704 of any valid credential.

In one or more configurations, the initialization broadcast 708a/708b may include a random phase. The first configuration request 710 may include a first phase parameter. A first configuration response, at 716, may include the fake configuration. The first configuration response, at 716, may include a second phase parameter. In one or more configurations, the first phase parameter and the second phase parameter may be each associated with a plurality of tones. In one or more configurations, the first configuration request 710 and the first configuration response, at 716, may be subjected to reciprocal phase rotations in transmission (The physical channels associated with the first configuration request 710 and the first configuration response at 716 may be reciprocal, that is, the physical channels may be the same and may introduce the same phase rotation to any signal that is propagating through them).

At 718, the network node 702 may receive a second configuration request from at least one genuine receiving device 706.

At 720, the network node 702 may identify that the at least one genuine receiving device 706 has a valid credential based on the second configuration request 718 and the authentication test.

At 722, the network node 702 may transmit a correct configuration to at least one genuine receiving device 706. In some configurations, the network node 702 may transmit a second configuration response including a correct configuration to the at least one genuine receiving device 706.

In one or more configurations, the fake configuration, at 716, and the correct configuration, at 722, may be transmitted in parallel via separate RF chains.

In one or more configurations, the fake configuration, at 716, and the correct configuration, at 722, may be transmitted based on time division multiplexing.

In one or more configurations, the second configuration response may further include a CRC.

In one or more configurations, the second configuration request 718 may include a third phase parameter. The second configuration response, at 722, may include a fourth phase parameter. In one or more configurations, the third phase parameter and the fourth phase parameter may be each associated with a plurality of tones. In one or more configurations, the second configuration request 718 and the second configuration response, at 722, may be subjected to reciprocal phase rotations in transmission.

At 724, the network node 702 may receive a NACK from the at least one genuine receiving device 706 based on the CRC.

At 726a, in response to the NACK, the network node 702 may retransmit the second configuration response to the at least one genuine receiving device 706.

In some configurations, alternative to 726a, at 726b, in response to the NACK, the network node 702 may refrain from transmitting a configuration response to the at least one genuine receiving device 706 for a predetermined period of time.

At 728, the network node 702 may identify a phase error between the network node 702 and the at least one genuine receiving device 706 based on periodically exchanging one or more known phase parameters with the at least one genuine receiving device 706.

At 730, the network node 702 may allow or suspend a configuration sharing process based on a comparison of the phase error to a threshold.

Figure 8:
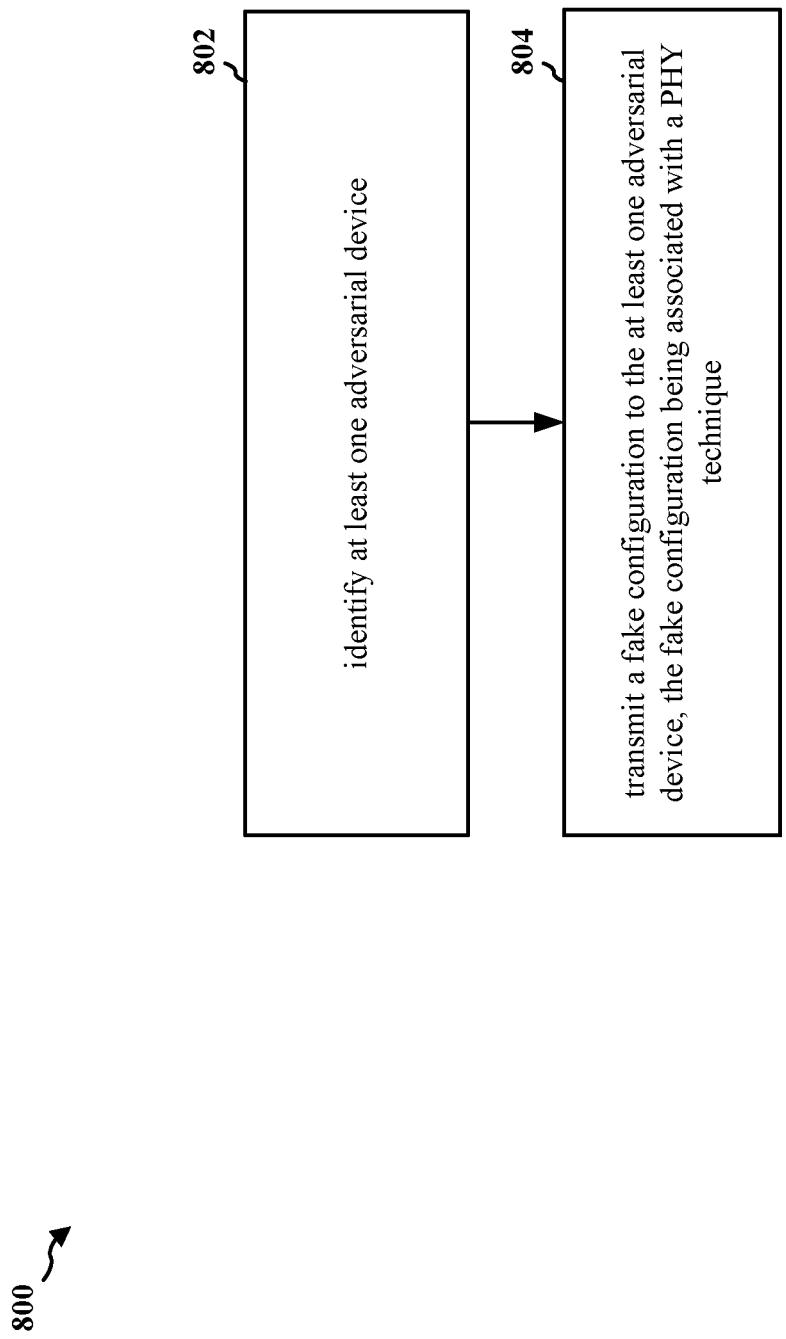
FIG. 8 is a flowchart of a method of wireless communication, in accordance with various aspects of the present disclosure.

FIG. 8 is a flowchart 800 of a method of wireless communication. The method may be performed by a base station/network node (e.g., the base station 102/310; the network node 702; the network entity 1002). At 802, the network node may identify at least one adversarial device. For example, 802 may be performed by the component 199 in FIG. 11. Referring to FIG. 7, at 714, the network node 702 may identify at least one adversarial device 704.

At 804, the network node may transmit a fake configuration to the at least one adversarial device. The fake configuration may be associated with a PHY technique. For example, 804 may be performed by the component 199 in FIG. 11. Referring to FIG. 7, at 716, the network node 702 may transmit a fake configuration to the at least one adversarial device 704.

Figure 9:
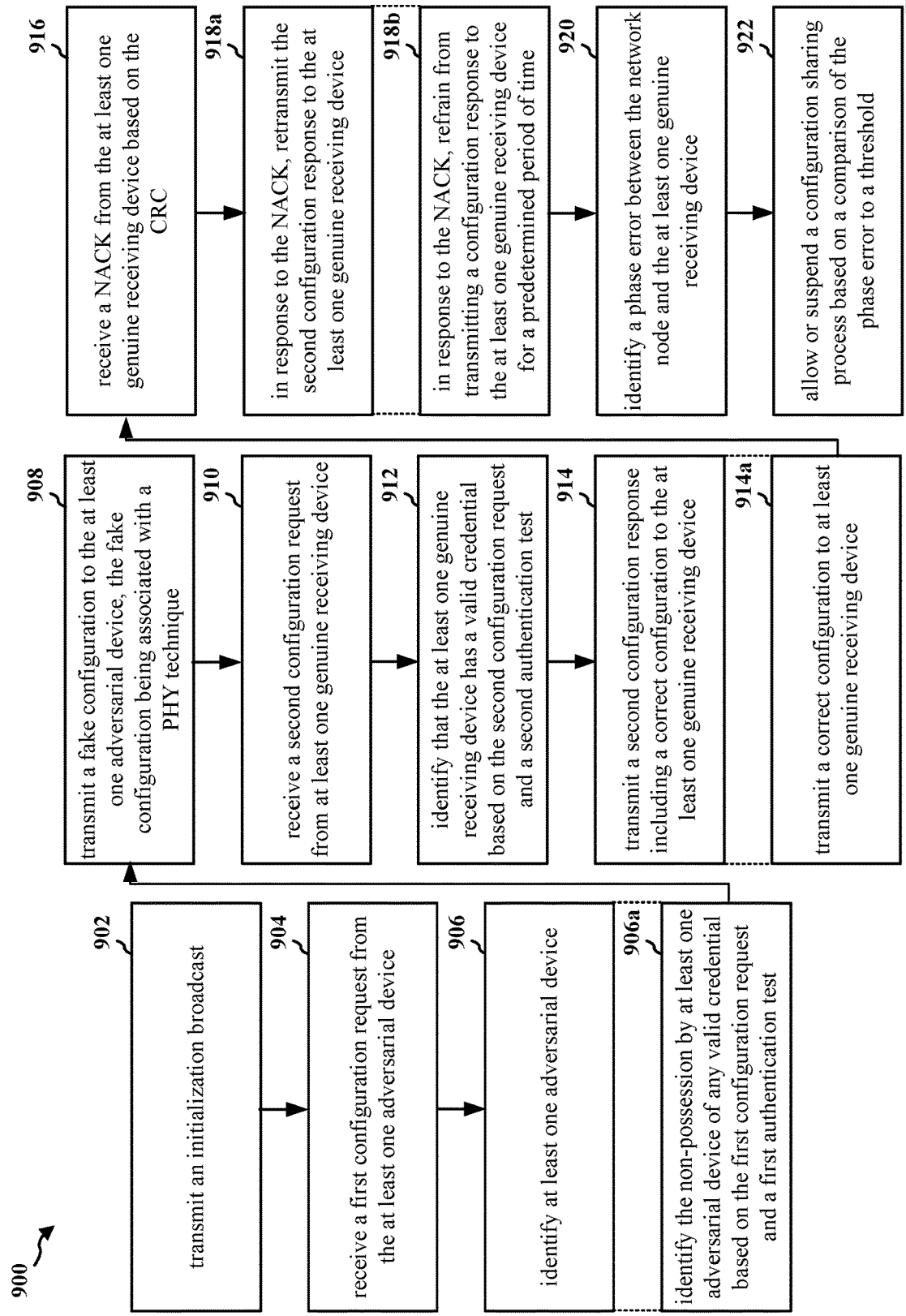
FIG. 9 is a flowchart of a method of wireless communication, in accordance with various aspects of the present disclosure.

FIG. 9 is a flowchart 900 of a method of wireless communication. The method may be performed by a base station/network node (e.g., the base station 102/310; the network node 702; the network entity 1002). At 906, the network node may identify at least one adversarial device. For example, 906 may be performed by the component 199 in FIG. 11. Referring to FIG. 7, at 714, the network node 702 may identify at least one adversarial device 704.

At 908, the network node may transmit a fake configuration to the at least one adversarial device. The fake configuration may be associated with a PHY technique. For example, 908 may be performed by the component 199 in FIG. 11. Referring to FIG. 7, at 716, the network node 702 may transmit a fake configuration to the at least one adversarial device 704.

In one configuration, referring to FIG. 7, of the fake configuration may be transmitted, at 716, to the at least one adversarial device 704 based on a location of the at least one adversarial device 704.

In one configuration, at 914a, the network node may transmit a correct configuration to at least one genuine receiving device. The correct configuration may be distinct from the fake configuration. For example, 914a may be performed by the component 199 in FIG. 11. Referring to FIG. 7, at 722, the network node 702 may transmit a correct configuration to at least one genuine receiving device 706.

In one configuration, the fake configuration and the correct configuration may be transmitted in parallel via separate RF chains.

In one configuration, the fake configuration and the correct configuration may be transmitted based on time division multiplexing.

In one configuration, referring to FIG. 7, the at least one adversarial device 704 may be identified, at 714, based on non-possession by the at least one adversarial device 704 of any valid credential.

In one configuration, at 902, the network node may transmit an initialization broadcast. For example, 902 may be performed by the component 199 in FIG. 11. Referring to FIG. 7, at 708a and 708b, the network node 702 may transmit an initialization broadcast.

At 904, the network node may receive a first configuration request from the at least one adversarial device. For example, 904 may be performed by the component 199 in FIG. 11. Referring to FIG. 7, at 710, the network node 702 may receive a first configuration request from the at least one adversarial device 704.

At 906a, the network node may identify the non-possession by the at least one adversarial device of any valid credential based on the first configuration request and a first authentication test. In some configurations, 906a may be part of 906. For example, 906a may be performed by the component 199 in FIG. 11. Referring to FIG. 7, at 712, the network node 702 may identify the non-possession by the at least one adversarial device 704 of any valid credential based on the first configuration request 710 and an authentication test.

In one configuration, at 910, the network node may receive a second configuration request from at least one genuine receiving device. For example, 910 may be performed by the component 199 in FIG. 11. Referring to FIG. 7, at 718, the network node 702 may receive a second configuration request from at least one genuine receiving device 706.

At 912, the network node may identify that the at least one genuine receiving device has a valid credential based on the second configuration request and a second authentication test. For example, 912 may be performed by the component 199 in FIG. 11. Referring to FIG. 7, at 720, the network node 702 may identify that the at least one genuine receiving device 706 has a valid credential based on the second configuration request 718 and the authentication test.

At 914, the network node may transmit a second configuration response including a correct configuration to the at least one genuine receiving device. For example, 914 may be performed by the component 199 in FIG. 11. Referring to FIG. 7, at 722, the network node 702 may transmit a second configuration response including a correct configuration to the at least one genuine receiving device 706.

In one configuration, referring to FIG. 7, the second configuration response, at 722, may further include a CRC.

In one configuration, at 916, the network node may receive a NACK from the at least one genuine receiving device based on the CRC. For example, 916 may be performed by the component 199 in FIG. 11. Referring to FIG. 7, at 724, the network node 702 may receive a NACK from the at least one genuine receiving device 706 based on the CRC.

In one configuration, at 918a, in response to the NACK, the network node may retransmit the second configuration response to the at least one genuine receiving device. For example, 918a may be performed by the component 199 in FIG. 11. Referring to FIG. 7, at 726a, in response to the NACK, the network node 702 may retransmit the second configuration response to the at least one genuine receiving device 706.

In one configuration, alternative to 918a (e.g., when the channel condition is poor), at 918b, in response to the NACK, the network node may refrain from transmitting a configuration response to the at least one genuine receiving device for a predetermined period of time. For example, 918b may be performed by the component 199 in FIG. 11. Referring to FIG. 7, at 726b, in response to the NACK, the network node 702 may refrain from transmitting a configuration response to the at least one genuine receiving device 706 for a predetermined period of time.

In one configuration, referring to FIG. 7, the second configuration request 718 may include a third phase parameter. The second configuration response, at 722, may include a fourth phase parameter.

In one configuration, the third phase parameter and the fourth phase parameter may be each associated with a plurality of tones.

In one configuration, referring to FIG. 7, the second configuration request 718 and the second configuration response, at 722, may be subjected to reciprocal phase rotations in transmission.

In one configuration, at 920, the network node may identify a phase error between the network node and the at least one genuine receiving device based on periodically exchanging one or more known phase parameters with the at least one genuine receiving device. For example, 920 may be performed by the component 199 in FIG. 11. Referring to FIG. 7, at 728, the network node 702 may identify a phase error between the network node 702 and the at least one genuine receiving device 706 based on periodically exchanging one or more known phase parameters with the at least one genuine receiving device 706.

At 922, the network node may allow or suspend a configuration sharing process based on a comparison of the phase error to a threshold. For example, 922 may be performed by the component 199 in FIG. 11. Referring to FIG. 7, at 730, the network node 702 may allow or suspend a configuration sharing process based on a comparison of the phase error to a threshold.

In one configuration, referring to FIG. 7, the initialization broadcast 708a/708b may include a random phase. A first configuration response, at 716, may include the fake configuration. The first configuration request 710 may include a first phase parameter. The first configuration response, at 716, may include a second phase parameter.

In one configuration, the first phase parameter and the second phase parameter may be each associated with a plurality of tones.

In one configuration, referring to FIG. 7, the first configuration request 710 and the first configuration response, at 716, may be subjected to reciprocal phase rotations in transmission.

In one configuration, the first authentication test may include a distribution-based hypothesis test or a Hamming distance-based similarity test. In particular, the hypothesis testing may be a function to evaluate whether the received credential is authentic. Since the received signal to this end (i.e., the configuration response) involves random variables (e.g., the channel gain), the hypothesis test may be constructed using the distribution of these random variables. The resulting test may be referred to as the distribution-based hypothesis test. Further, for the Hamming distance-based similarity test, the distributions may not be considered; rather, the received vector involving the credentials may be compared against the expected vector (as the credential is already known at the receiver). Authenticity may be identified or assumed if these two vectors are sufficiently similar (e.g., if the difference between the two vectors is below a threshold).

Figure 10:
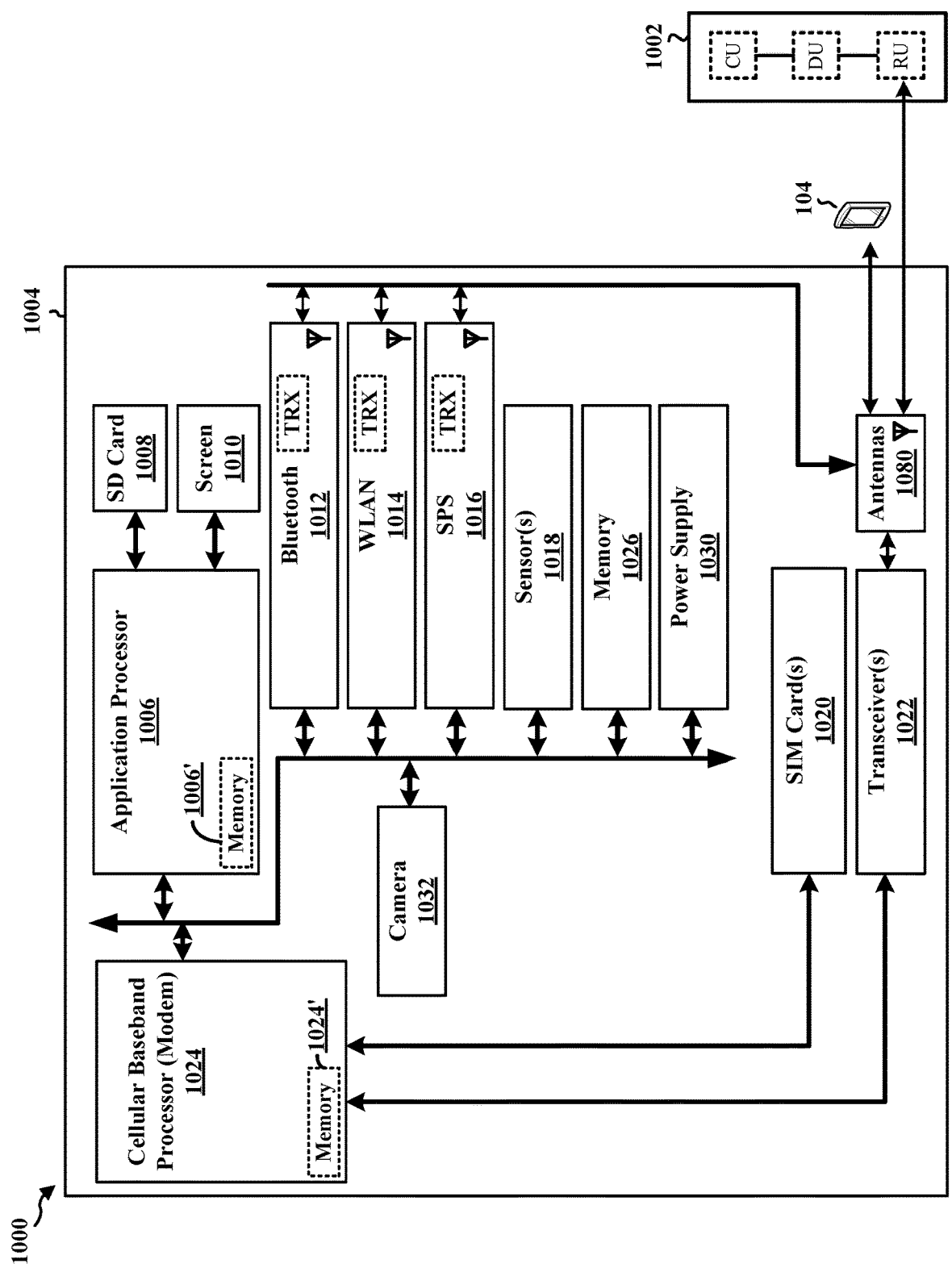
FIG. 10 is a diagram illustrating an example of a hardware implementation for an example apparatus and/or network entity, in accordance with various aspects of the present disclosure.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see 350 of FIG. 3) and include the additional modules of the apparatus 1004.

Figure 11:
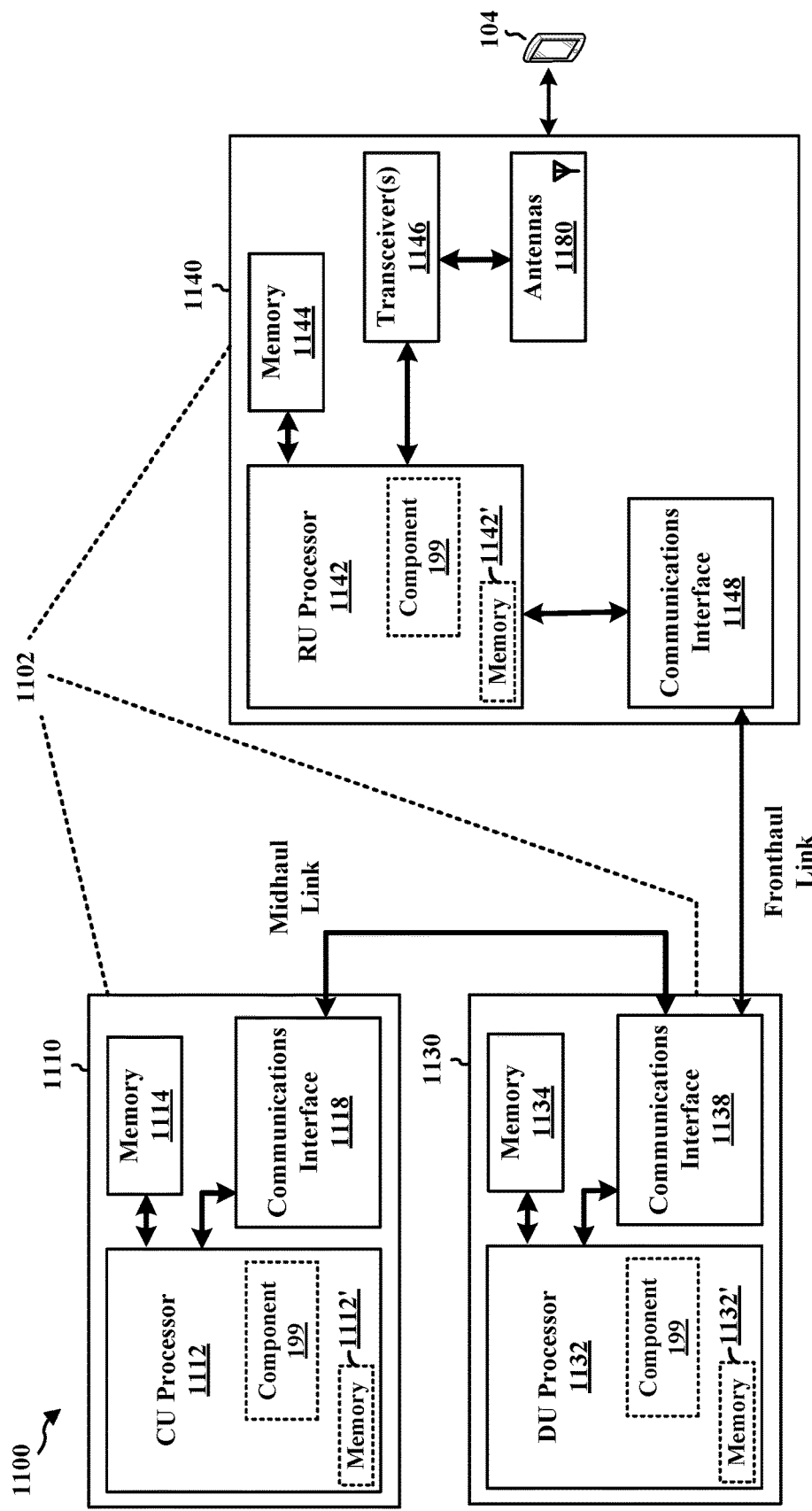
FIG. 11 is a diagram illustrating an example of a hardware implementation for an example network entity, in accordance with various aspects of the present disclosure.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to identify at least one adversarial device. The component 199 may be configured to transmit a fake configuration to the at least one adversarial device. The fake configuration may be associated with a PHY technique. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for identifying at least one adversarial device. The network entity 1102 includes means for transmitting a fake configuration to the at least one adversarial device. The fake configuration may be associated with a PHY technique.

In one configuration, the fake configuration may be transmitted to the at least one adversarial device based on a location of the at least one adversarial device. In one configuration, the network entity 1102 includes means for transmitting a correct configuration to at least one genuine receiving device. The correct configuration may be distinct from the fake configuration. In one configuration, the fake configuration and the correct configuration may be transmitted in parallel via separate RF chains. In one configuration, the fake configuration and the correct configuration may be transmitted based on time division multiplexing. In one configuration, the at least one adversarial device may be identified based on non-possession by the at least one adversarial device of any valid credential. In one configuration, the network entity 1102 includes means for transmitting an initialization broadcast. The network entity 1102 includes means for receiving a first configuration request from the at least one adversarial device. The network entity 1102 includes means for identifying the non-possession by the at least one adversarial device of any valid credential based on the first configuration request and a first authentication test. In one configuration, the network entity 1102 includes means for receiving a second configuration request from at least one genuine receiving device. The network entity 1102 includes means for identifying that the at least one genuine receiving device has a valid credential based on the second configuration request and a second authentication test. The network entity 1102 includes means for transmitting a second configuration response including a correct configuration to the at least one genuine receiving device. In one configuration, the second configuration response may further include a CRC. In one configuration, the network entity 1102 includes means for receiving a NACK from the at least one genuine receiving device based on the CRC. In one configuration, in response to the NACK, the network entity 1102 includes means for retransmitting the second configuration response to the at least one genuine receiving device. In one configuration, in response to the NACK, the network entity 1102 includes means for refraining from transmitting a configuration response to the at least one genuine receiving device for a predetermined period of time. In one configuration, the second configuration request may include a third phase parameter. The second configuration response may include a fourth phase parameter. In one configuration, the third phase parameter and the fourth phase parameter may be each associated with a plurality of tones. In one configuration, the second configuration request and the second configuration response may be subjected to reciprocal phase rotations in transmission. In one configuration, the network entity 1102 includes means for identifying a phase error between the network node and the at least one genuine receiving device based on periodically exchanging one or more known phase parameters with the at least one genuine receiving device. The network entity 1102 includes means for allowing or suspending a configuration sharing process based on a comparison of the phase error to a threshold. In one configuration, the initialization broadcast may include a random phase. A first configuration response may include the fake configuration. The first configuration request may include a first phase parameter. The first configuration response may include a second phase parameter. In one configuration, the first phase parameter and the second phase parameter may be each associated with a plurality of tones. In one configuration, the first configuration request and the first configuration response may be subjected to reciprocal phase rotations in transmission. In one configuration, the first authentication test may include a distribution-based hypothesis test or a Hamming distance-based similarity test.

The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-11, a network node may identify at least one adversarial device. The network node may transmit a fake configuration to the at least one adversarial device. The fake configuration may be associated with a PHY technique. Accordingly, security of the overall system may be improved as the adversarial device may waste time and power performing algorithmic operations based on the fake configuration.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network node, including identifying at least one adversarial device; and transmitting a fake configuration to the at least one adversarial device, the fake configuration being associated with a PHY technique.

Aspect 2 is the method of aspect 1, where the fake configuration is transmitted to the at least one adversarial device based on a location of the at least one adversarial device.

Aspect 3 is the method of aspect 2, further including: transmitting a correct configuration to at least one genuine receiving device, where the correct configuration is distinct from the fake configuration.

Aspect 4 is the method of aspect 3, where the fake configuration and the correct configuration are transmitted in parallel via separate RF chains.

Aspect 5 is the method of aspect 3, where the fake configuration and the correct configuration are transmitted based on time division multiplexing.

Aspect 6 is the method of aspect 1, where the at least one adversarial device is identified based on non-possession by the at least one adversarial device of any valid credential.

Aspect 7 is the method of aspect 6, further including: transmitting an initialization broadcast; receiving a first configuration request from the at least one adversarial device; and identifying the non-possession by the at least one adversarial device of any valid credential based on the first configuration request and a first authentication test.

Aspect 8 is the method of aspect 7, further including: receiving a second configuration request from at least one genuine receiving device; identifying that the at least one genuine receiving device has a valid credential based on the second configuration request and a second authentication test; and transmitting a second configuration response including a correct configuration to the at least one genuine receiving device.

Aspect 9 is the method of aspect 8, where the second configuration response further includes a CRC.

Aspect 10 is the method of aspect 9, further including: receiving a NACK from the at least one genuine receiving device based on the CRC, where, in response to the NACK, the method further includes: retransmitting the second configuration response to the at least one genuine receiving device; or refraining from transmitting a configuration response to the at least one genuine receiving device for a predetermined period of time.

Aspect 11 is the method of any of aspects 8 to 10, where the second configuration request includes a third phase parameter, and the second configuration response includes a fourth phase parameter.

Aspect 12 is the method of aspect 11, where the third phase parameter and the fourth phase parameter are each associated with a plurality of tones.

Aspect 13 is the method of any of aspects 8 to 12, where the second configuration request and the second configuration response are subjected to reciprocal phase rotations in transmission.

Aspect 14 is the method of any of aspects 8 to 13, further including: identifying a phase error between the network node and the at least one genuine receiving device based on periodically exchanging one or more known phase parameters with the at least one genuine receiving device; and allowing or suspending a configuration sharing process based on a comparison of the phase error to a threshold.

Aspect 15 is the method of any of aspects 7 to 14, where the initialization broadcast includes a random phase, the first configuration request includes a first phase parameter, a first configuration response includes the fake configuration, and the first configuration response includes a second phase parameter.

Aspect 16 is the method of aspect 15, where the first phase parameter and the second phase parameter are each associated with a plurality of tones.

Aspect 17 is the method of any of aspects 15 and 16, where the first configuration request and the first configuration response are subjected to reciprocal phase rotations in transmission.

Aspect 18 is the method of any of aspects 7 to 17, where the first authentication test includes a distribution-based hypothesis test or a Hamming distance-based similarity test.

Aspect 19 is an apparatus for wireless communication including at least one processor coupled to a memory and, based at least in part on information stored in the memory, the at least one processor is configured to implement a method as in any of aspects 1 to 18.

Aspect 20 may be combined with aspect 19 and further includes a transceiver coupled to the at least one processor.

Aspect 21 is an apparatus for wireless communication including means for implementing any of aspects 1 to 18.

Aspect 22 is a non-transitory computer-readable storage medium storing computer executable code, where the code when executed by a processor causes the processor to implement any of aspects 1 to 18.

Various aspects have been described herein. These and other aspects are within the scope of the following claims.

What is claimed is:

1. An apparatus for wireless communication at a network node, comprising:
a memory; and
at least one processor coupled to the memory and, based at least in part on information stored in the memory, the at least one processor is configured to:
transmit an initialization broadcast;
receive a first configuration request from at least one adversarial device;
identify non-possession by the at least one adversarial device of any valid credential based on the first configuration request and a first authentication test; and
transmit a fake configuration to the at least one adversarial device, the fake configuration being associated with a physical layer (PHY) technique.

2. The apparatus of claim 1, wherein the fake configuration is transmitted to the at least one adversarial device based on a location of the at least one adversarial device.

3. The apparatus of claim 2, the at least one processor being configured to:
transmit a correct configuration to at least one genuine receiving device, wherein the correct configuration is distinct from the fake configuration.

4. The apparatus of claim 3, wherein the fake configuration and the correct configuration are transmitted in parallel via separate radio frequency (RF) chains.

5. The apparatus of claim 3, wherein the fake configuration and the correct configuration are transmitted based on time division multiplexing.

6. The apparatus of claim 1, the at least one processor being configured to:
receive a second configuration request from at least one genuine receiving device;
identify that the at least one genuine receiving device has a valid credential based on the second configuration request and a second authentication test; and transmit a second configuration response including a correct configuration to the at least one genuine receiving device.

7. The apparatus of claim 6, wherein the second configuration response further includes a cyclic redundancy check (CRC).

8. The apparatus of claim 7, the at least one processor being configured to:
receive a negative acknowledgement (NACK) from the at least one genuine receiving device based on the CRC, wherein, in response to the NACK, the at least one processor is further configured to:
retransmit the second configuration response to the at least one genuine receiving device; or
refrain from transmitting a configuration response to the at least one genuine receiving device for a predetermined period of time.

9. The apparatus of claim 6, wherein the second configuration request includes a third phase parameter, and the second configuration response includes a fourth phase parameter.

10. The apparatus of claim 9, wherein the third phase parameter and the fourth phase parameter are each associated with a plurality of tones.

11. The apparatus of claim 6, wherein the second configuration request and the second configuration response are subjected to reciprocal phase rotations in transmission.

12. The apparatus of claim 6, the at least one processor being configured to:
identify a phase error between the network node and the at least one genuine receiving device based on periodically exchanging one or more known phase parameters with the at least one genuine receiving device; and
allow or suspend a configuration sharing process based on a comparison of the phase error to a threshold.

13. The apparatus of claim 1, wherein the initialization broadcast includes a random phase, the first configuration request includes a first phase parameter, a first configuration response includes the fake configuration, and the first configuration response includes a second phase parameter.

14. The apparatus of claim 13, wherein the first phase parameter and the second phase parameter are each associated with a plurality of tones.

15. The apparatus of claim 13, wherein the first configuration request and the first configuration response are subjected to reciprocal phase rotations in transmission.

16. The apparatus of claim 1, wherein the first authentication test includes a distribution-based hypothesis test or a Hamming distance-based similarity test.

17. The apparatus of claim 1, further comprising a transceiver coupled to the at least one processor.

18. A method of wireless communication at a network node, comprising:
transmitting an initialization broadcast;
receiving a first configuration request from at least one adversarial device;
identifying non-possession by the at least one adversarial device of any valid credential based on the first configuration request and a first authentication test; and
transmitting a fake configuration to the at least one adversarial device, the fake configuration being associated with a physical layer (PHY) technique.

19. The method of claim 18, wherein the fake configuration is transmitted to the at least one adversarial device based on a location of the at least one adversarial device.

20. The method of claim 19, further comprising:
transmitting a correct configuration to at least one genuine receiving device, wherein the correct configuration is distinct from the fake configuration.

21. The method of claim 20, wherein the fake configuration and the correct configuration are transmitted in parallel via separate radio frequency (RF) chains.

22. The method of claim 20, wherein the fake configuration and the correct configuration are transmitted based on time division multiplexing.

23. The method of claim 18, further comprising:
receiving a second configuration request from at least one genuine receiving device;
identifying that the at least one genuine receiving device has a valid credential based on the second configuration request and a second authentication test; and
transmitting a second configuration response including a correct configuration to the at least one genuine receiving device.

24. The method of claim 23, wherein the second configuration request and the second configuration response are subjected to reciprocal phase rotations in transmission.

25. The method of claim 23, further comprising:
identifying a phase error between the network node and the at least one genuine receiving device based on periodically exchanging one or more known phase parameters with the at least one genuine receiving device; and
allowing or suspending a configuration sharing process based on a comparison of the phase error to a threshold.

26. A non-transitory computer-readable medium storing computer executable code at a network node, the code when executed by a processor causes the processor to:
transmit an initialization broadcast;
receive a first configuration request from at least one adversarial device;
identify non-possession by the at least one adversarial device of any valid credential based on the first configuration request and a first authentication test; and
transmit a fake configuration to the at least one adversarial device, the fake configuration being associated with a physical layer (PHY) technique.

27. The method of claim 23, wherein the second configuration response further includes a cyclic redundancy check (CRC), the method further comprising:
receiving a negative acknowledgement (NACK) from the at least one genuine receiving device based on the CRC, wherein, in response to the NACK, the method further comprising:
retransmitting the second configuration response to the at least one genuine receiving device; or
refraining from transmitting a configuration response to the at least one genuine receiving device for a predetermined period of time.

28. The method of claim 23, wherein the second configuration request includes a third phase parameter, and the second configuration response includes a fourth phase parameter; and wherein the third phase parameter and the fourth phase parameter are each associated with a plurality of tones.

29. The method of claim 18, wherein the initialization broadcast includes a random phase, the first configuration request includes a first phase parameter, a first configuration response includes the fake configuration, and the first configuration response includes a second phase parameter; wherein the first phase parameter and the second phase parameter are each associated with a plurality of tones; and wherein the first configuration request and the first configuration response are subjected to reciprocal phase rotations in transmission.

30. The method of claim 18, wherein the first authentication test includes a distribution-based hypothesis test or a Hamming distance-based similarity test.

* * * * *